United States Patent

[11] 3,633,436

[72] Inventor  Thomas William Freiburger
                Dubuque, Iowa
[21] Appl. No. 79,514
[22] Filed     Oct. 9, 1970
[45] Patented  Jan. 11, 1972
[73] Assignee  Deere & Company
                Moline, Ill.

[54] SINGLE-LEVER ACTUATED LINKAGE FOR CONTROLLING THE TRANSMISSION AND STEERING OF A CRAWLER TRACTOR
23 Claims, 4 Drawing Figs.

[52] U.S. Cl. .................................................. 74/471 XY,
                                   74/491, 180/6.38, 180/77 H
[51] Int. Cl. ...................................................... G05g 9/04
[50] Field of Search .......................................... 74/471 XY,
                                        471, 491; 180/6.48, 77 H

[56]         References Cited
            UNITED STATES PATENTS
3,055,445   9/1962   Mendez et al. ................ 74/471 X FOREIGN PATENTS
1,404,537   5/1965   France ......................... 180/6.48

Primary Examiner—Milton Kaufman
Attorneys—H. Vincent Harsha, Harold M. Knoth, William A. Murray, John M. Nolan and Jimmie R. Oaks ABSTRACT: A control linkage for a crawler tractor includes first, second and third two-armed cranks mounted for selective rocking about a horizontal transverse shaft and connected for respectively controlling the transmission settings and the steering. An upwardly extending hand lever for actuating the cranks has a longitudinally extending bottom end portion pivotally mounted in one arm of the first crank and is movable fore-and-aft to rock the first crank and shift the transmission. An inverted U-shaped housing straddles the lever and pivots about a longitudinal axis so as to be swung transversely with the lever when the latter is swung about its pivot connection. A pair of oppositely extending transverse members are fixed to the housing and respectively rock the second and third cranks to steer the tractor to the right and to the left when the housing is swung respectively to the right and to the left from a vertical position by means of the lever.

PATENTED JAN 11 1972 3,633,436

INVENTOR.
THOMAS W. FREIBURGER

INVENTOR.
THOMAS W. FREIBURGER

3,633,436

SINGLE-LEVER ACTUATED LINKAGE FOR CONTROLLING THE TRANSMISSION AND STEERING OF A CRAWLER TRACTOR

BACKGROUND OF THE INVENTION

The present invention relates to a control linkage, and more particularly relates to a mechanical linkage which is selectively actuated by a single hand lever for controlling the transmission settings and steering of a crawler tractor.

Conventional crawler tractors are provided with separate hand levers for controlling the drives to the tracks for steering the tractor respectively to the right and to the left and are provided with separate shift levers for controlling the range and gear ratio settings of the transmission. These tractors are further provided with levers, in varying numbers, for controlling the operation of auxiliary equipment such as bulldozers, front end loaders, rippers, and the like. Since there are limits to where a lever may be placed and still be compatible with the human structure, the prior art levers are often crowded or placed other than advantageously with respect to the operator and his natural movements. Further, the operator is required to shift his hands from lever to lever, thus lessening his operating efficiency.

Attempts have been made to overcome some of the above-noted problems by providing linkages which selectively control more than one function through actuation by a single lever. These linkages have not proved to be entirely satisfactory, since they are cumbersome and/or require such precise movements of the actuating lever that even the most experienced operators have difficulty in actuating the linkage. Furthermore, some of the linkages are ungainly in size and are therefore difficult to mount in the limited space available at the operator's station.

SUMMARY OF THE INVENTION

According to the present invention, there is provided a novel linkage which is selectively actuated by a single lever for controlling the steering and the transmission settings of a crawler tractor.

It is an object of the invention to provide such a linkage which is compact and easily assembled.

Another object is to provide a linkage which is actuated by shifting the lever in logical, easy to follow paths with reference to the natural movements of the human structure.

Yet another object is to provide a linkage which may be actuated with a minimum of manual effort.

These and other objects will become apparent from the ensuing description and the appended drawings.

DESCRIPTION OF THE PREFERRED EMBODIMENT

Figure 1:
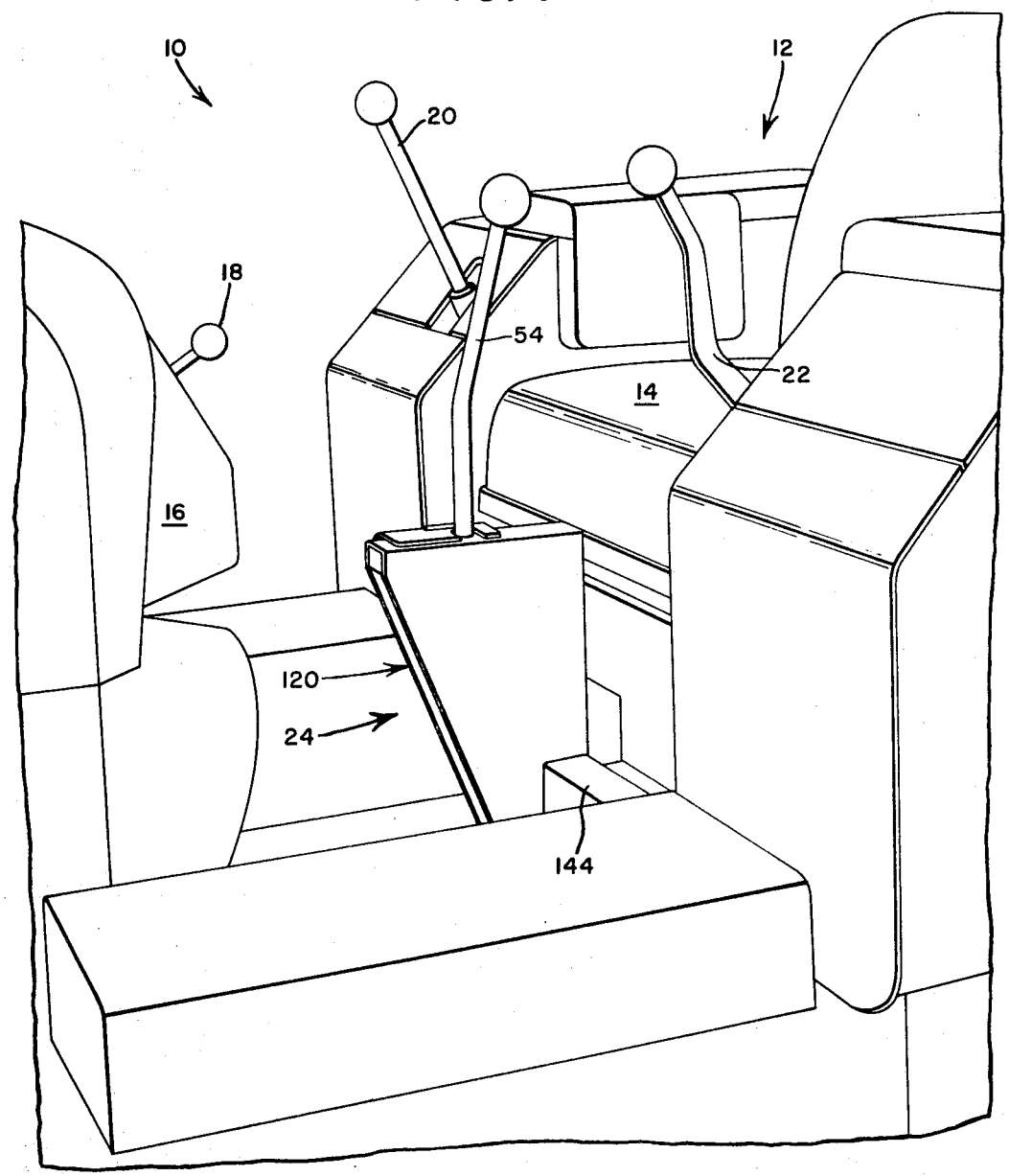
FIG. 1 is a perspective view partially showing the operator's station of a crawler tractor and the controls located thereat.
Figure 2:
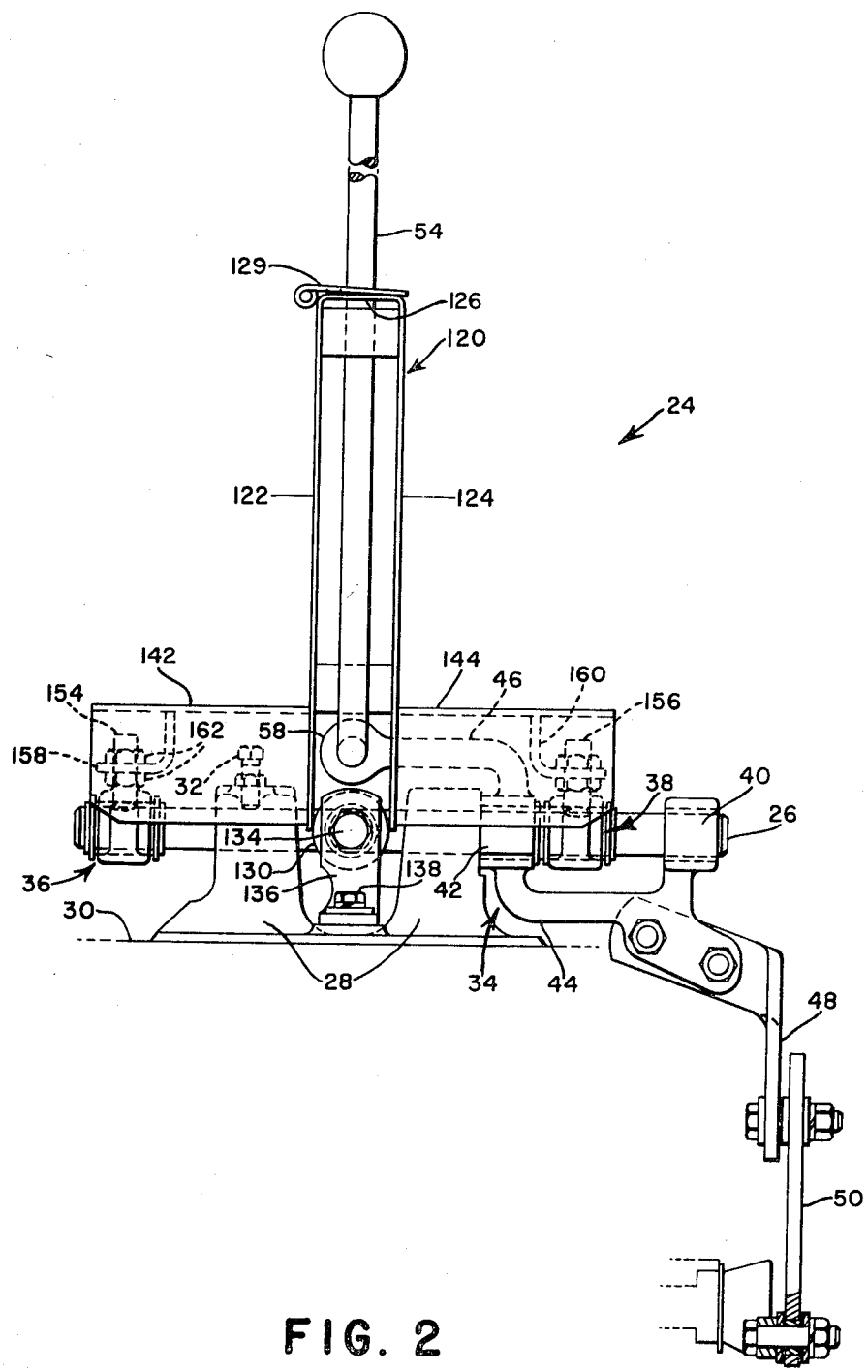
FIG. 2 is a front elevational view of the linkage and actuating lever.

Referring now to FIG. 1, there is partially shown a crawler tractor indicated in its entirety by the reference numeral 10. Although not apparent from the illustration, the tractor 10 is of the conventional type, having right and left steering clutches and brakes associated with final drives for right and left tracks, and having a transmission which is shiftable, by a first actuator, to different speed or range settings, and which is shiftable by a second actuator among high, low, reverse, and neutral gear settings.

The tractor 10 includes an operator's station 12 at which there is a centrally located seat 14, and located for easy grasp of an operator positioned in the seat 14 is a plurality of controls for the tractor and for auxiliary equipment attached to the tractor. Specifically, forwardly of the seat 14 and projecting rearwardly from a dash 16 is a throttle lever 18 and located forwardly of right and left arm rests of the seat 14 are a loader control lever 20 and a transmission speed shift lever 22, respectively. Positioned centrally on the tractor 10 in the region of the seat 14 is a control assembly 24 for controlling the transmission gear settings and the steering of the tractor.

The control assembly 24 includes a main horizontal transverse shaft 26, which is received in aligned bores provided in a pair of transversely spaced lugs 28 fixed to a transmission housing 30 at a location below and slightly forwardly of the forward edge of the seat 14. The shaft 26 is fixed against movement in the bores by means of a setscrew 32 in the right lug 28, right and left being determined as viewed by a forwardly facing operator in the seat 14. Spaced transversely along the shaft 26 and pivoted thereon for fore-and-aft rocking thereabout are a first crank 34 and identical second and third cranks 36 and 38, respectively. The first crank 34 includes spaced outer and inner bearing portions 40 and 42, respectively located at the left end and spaced inwardly from the left end of the shaft 26. First and second arms 44 and 46 extend oppositely, first radially then respectively to the left and to the right from the inner bearing portion 42. The first arm 44 includes a branch connected to the outer bearing portion 40 and includes an outer, rearwardly extending portion 48, to the end of which is pivotally connected one end of a link 50, which has its other end pivotally connected to a fore-and-aft rockable transmission gearshift arm 52, which is selectively shiftable among preselected angular positions for placing the transmission in high, low, reverse, and neutral conditions. As is apparent, the arm 52 may be rocked by rocking the crank 34 about the shaft 26 and for the latter purpose an upwardly extending hand lever 54 is connected to the crank 34 through a longitudinally extending bottom portion 56 of the lever, which is pivotally received in a longitudinally extending tubular end portion 58 of the second arm 46 of the crank 34, which portion 58 is located midway between the second and third cranks 36 and 38.

Mounted in longitudinal alignment with and for connection to rearwardly and upwardly projecting arms 60 and 62 of the cranks 36 and 38, respectively, are identical right and left power steering assemblies, of which only the right assembly 64 is illustrated and described. The assembly 64 includes a longitudinally extending piston rod 66 which has a head 68 at its forward end slidably mounted in a cylinder 70 and has a clevis 72 at its rearward end pivotally connected to a fore-and-aft pivotal arm 74 for actuating a right steering clutch and brake (not shown). Fluid pressure for actuating the rod 66 originates at a pump 78 from where it is delivered by means of a branched conduit 80 to axially spaced inlets 82 and 84 to a bore 86 of a flow divider valve 88. A shuttle valve member 90 is located in the bore 86 between the inlets 82 and 84, and, as is well known in the art, is axially shiftable in response to pressure at its opposite ends to direct varying amounts of fluid to axially spaced outlets 92 and 94 located between the inlets. The outlet 92 is connected to the left power steering cylinder (not shown) by a conduit 96 and the outlet 94 is connected by means of a conduit 97 to an inlet 98 located in the right cylinder 70 rearwardly of the head 68. When the power steering assembly is in a neutral condition (the condition illustrated) corresponding to straight-ahead travel of the tractor 10, fluid passes from the rearward side of the head 68 through a passage 100 to an axial cylindrical cavity 102 in the head 68 and from there it passes to an outlet 104 in the cylinder 70 forwardly of the head 68. The outlet 104 is connected to a reservoir 106 by a conduit 108.

Figure 3:
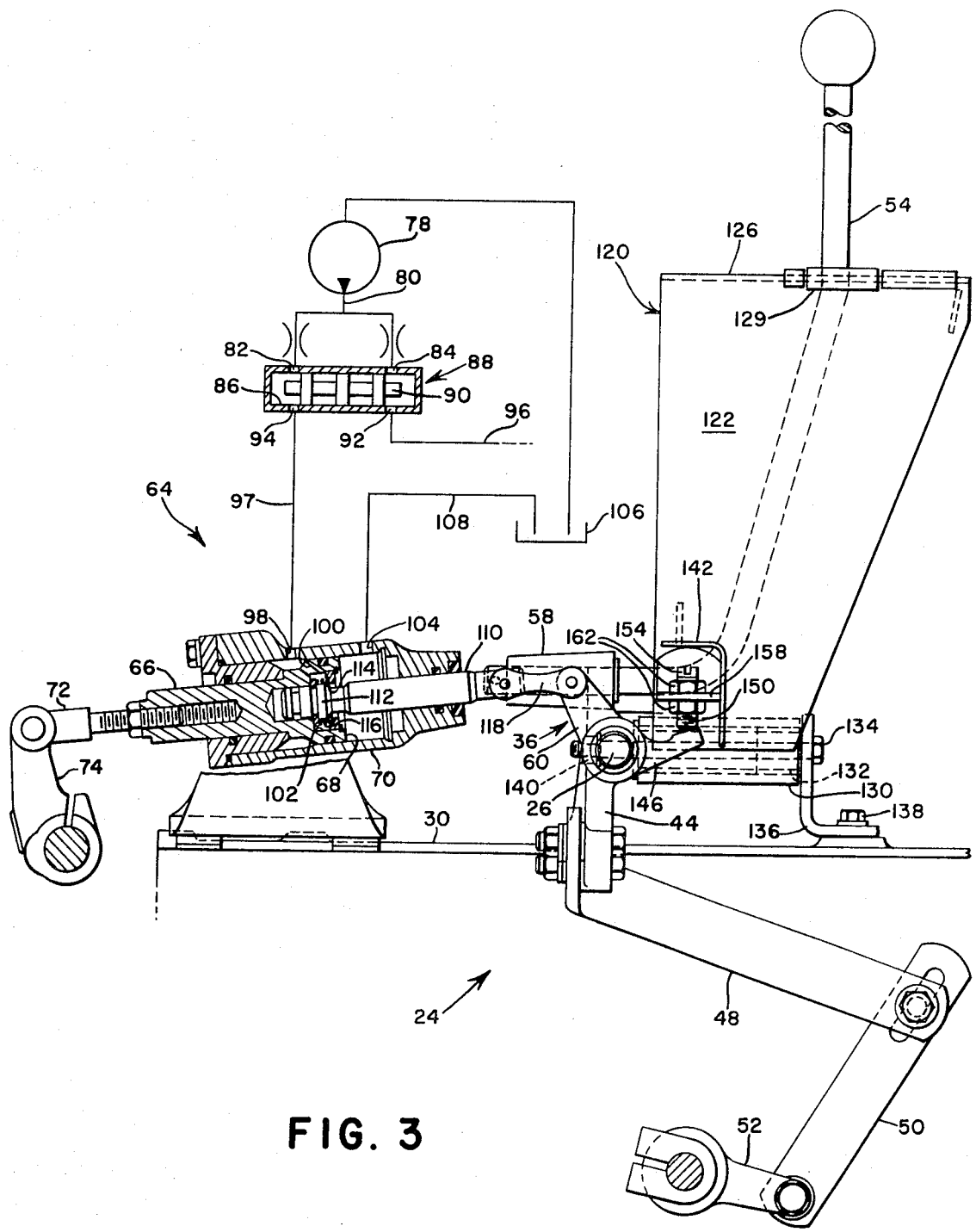
FIG. 3 is a side elevational view of the linkage shown in FIG. 2 and showing, in addition, a steering valve and cylinder in section and a schematic of the fluid system associated therewith.
Figure 4:
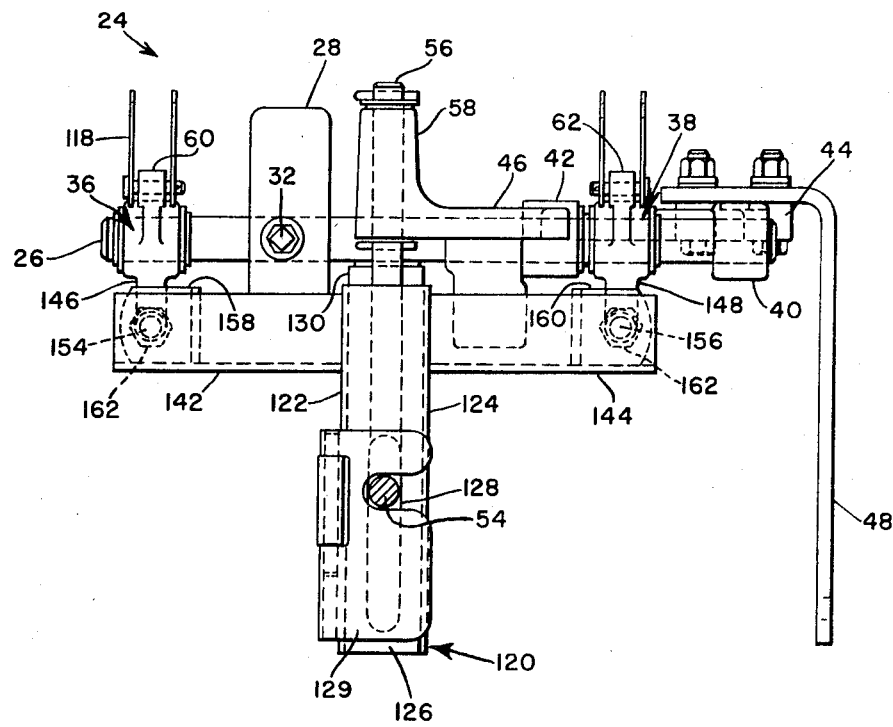
FIG. 4 is a top plan view of the linkage shown in FIG. 2.

The tractor 10 is steered to the right, when the tractor is traveling forwardly, by pressurizing the cylinder 70 rearwardly of the head 68 so as to cause the rod 66 to shift forwardly and rotate the arm 74 clockwise. To this end, a valve stem 110 is axially slidably mounted in the forward end of the cylinder 70 and has its rear end disposed in the axial cavity 102 in the piston head 68. The stem 110 includes an annular valve surface 112 which is disposed for engagement with an annular valve seat 114 at the entrance of the cavity 102 when the stem 110 is shifted forwardly. A spring 116 acts between the valve seat 114 and the valve stem 110 and biases the surface 112 away from the seat 114 to maintain the neutral condition of the assembly 64. The stem 110 is connected to the arm 60 of the crank 36 by a link 118. Thus, the stem 110 is shifted against the bias of the spring 116 by rotating the crank 36 clockwise, as viewed in FIG. 3.

The rotation of the right crank 36 and also the left crank 38 is selectively initiated by swinging the hand lever 54 respectively to the right and to the left, from the vertical position illustrated, about its pivotal connection with the first crank 34. For this purpose, there is provided an inverted, U-shaped housing 120 including spaced, parallel planar sides 122 and 124 disposed in straddling relationship to the opposite transverse sides of the lever 54 and joined at their tops by a web 126, in which there is a fore-and-aft extending slot 128, in which the lever is received for fore-and-aft movement when shifting the transmission. A notched latch member 129 is hinged along one side of the web 126 so as to be movable between a first position out of conflict with the lever 54 to a second position, wherein it is located across the slot 128 to lock the lever in the position it occupies when the transmission is in a neutral condition. This latter position is that illustrated in the drawings. The bottoms of the sides 122 and 124 are joined by a horizontal, longitudinally extending tube 130, in which is located a bushing and sleeve assembly 132 rotatably mounted on a pivot bolt 134 located vertically below the bottom portion of the lever 54 and which extends through longitudinally spaced and aligned bores in the shaft 26 and in an L-shaped bracket 136 fixed to the housing 30 by a screw 138. The pivot bolt 134 is held in place by a nut 140. Right and left angle members 142 and 144 are fixed perpendicular to and extend oppositely transversely from the sides 122 and 124 and respectively terminate generally in the regions of the right and left cranks 36 and 38. The cranks 36 and 38 have forwardly and upwardly projecting arms 146 and 148, which have upwardly directed bearing surfaces 150, only the surface of the arm 146 being shown. These bearing surfaces are respectively located vertically beneath adjustable screws 154 and 156 which are located in brackets 158 and 160 fixed to the angle members 142 and 144, and which are adjusted so as to just contact the bearing surfaces 150 when the housing 120 is vertically disposed as illustrated. Pairs of locknuts 162 hold the setscrews in their adjusted positions.

Thus, it can be seen that the housing 120 is pivoted to the right or left about the bolt 134, respectively, whenever the lever 54 is pivoted to the right or left about its connection with the crank 34, and that the right and left cranks 36 and 38 are pivoted accordingly.

In operation, assuming that the transmission and power steering assemblies are initially in neutral conditions, the hand lever 54 and hence the remainder of the control assembly 24 will be in the condition illustrated and the tractor 10 will be neutral. To ready the tractor 10 for forward movement, the neutral lock 129 is pivoted so as to free the hand lever 54 for fore-and-aft movement. The lever 54 is then moved to a predetermined position within the slot 128 to rock the crank 34 about the shaft 26 to cause the transmission gearshift arm 52 to establish either a high- or a low-gear range setting in the transmission. Once the desired range setting is established, a foot clutch (not shown) is depressed in the usual manner and the speed shift lever 22 is shifted to a desired speed. The clutch is then released to drivingly engage the transmission with the drives to the right and left tracks.

If it is now desired to steer the tractor 10 to the right, the lever 54 is swung to the right about its pivotal connection with the crank 34. This connection permits the lever 54 to be swung without effecting any changes in the transmission shift arm 52. As the lever is swung rightward, it engages the right side of the slot 128 and causes corresponding rightward swinging of the housing 120 about the bolt 134. This causes the setscrew 154 to move downwardly, and, through its bearing abutment with the surface 150 of the right crank 36, it causes the right crank 36 to pivot clockwise about the shaft 26. The valve stem 110 is thus shifted forwardly against the bias of the spring 116 to seat the valve surface 112 against the seat 114. The fluid pressure then increases at the rearward end of the cylinder 70 and this increase in pressure is sensed by the shuttle valve 90 which shifts to direct a greater portion of the flow delivered by the pump 78 to the cylinder 70 to further increase the pressure in the rearward end of the cylinder. This pressure acts on the rearward side of the piston rod head 68 and the rod 66 is shifted forwardly and rocks the actuator arm 74 clockwise to engage the steering brake to the drive for the right track to cause the tractor to be steered to the right. Left steering is similarly accomplished by swinging the lever 54 to the left from its central position.

If, while steering to the right or left, it is desired to reverse the direction of travel of the tractor 10, it is necessary only to move the lever 54 in the fore-and-aft direction to a predetermined position, causing the crank 34 to swing about the shaft 26 to reposition the transmission shift arm 52 to establish a reverse condition in the transmission. Thus, it can be seen that the single control lever 54 may be used to initiate changes in the transmission without affecting the steering of the tractor, and vice versa.

It is to be noted that the pivot bolt 134, about which the housing 120 swings, is so positioned in relationship to the slot 128 and the setscrews 154 and 156 that the force transferred from the lever 54 to the sides of the slot 128 to initiate left or right steering is multiplied substantially to rock the cranks 36 and 38, thus requiring little manual effort from the operator. This is important since it is difficult for an operator to apply much sideways force.

I claim:

1. In a vehicle of the type including an operator's station, a seat located at the station, a plurality of control levers located at the station so as to be within easy grasp of an operator positioned in the seat, and transmission, right steering, and left steering control elements located on the vehicle in the region of the station, a novel control means comprising: a shaft fixed to the vehicle at said station; first, second, and third cranks pivotally mounted for individual rocking about the axis of said shaft and being respectively connected to said transmission, right steering, and left steering control elements; a pair of side-by-side members extending crosswise to said shaft and being spaced from each other axially with respect to said shaft, said members being mounted on said vehicle adjacent said shaft for swinging movement lengthwise relative to said shaft; said spaced members respectively having parts including means extending respectively adjacent to the regions occupied by the second and third cranks, said second and third cranks each having arm portions respectively located in the paths of movement of said means for coaction therewith for selective movement thereby when said spaced members are swung to either side of an intermediate neutral position; and a hand lever for selectively rocking said first crank about said shaft and for swinging said spaced members to rock said second and third cranks about said shaft, said lever extending between said spaced members and being pivotally connected to said first crank for swinging movement lengthwise relative to said shaft.

2. The invention defined in claim 1 wherein said spaced members are interconnected by a web having a slot therein extending crosswise to said shaft and said lever extending through said slot for free movement therein for rocking said first crank about said shaft.

3. The invention defined in claim 1 wherein the pivotal connection between said lever and said first crank includes a tubular portion of said first crank located midway between said second and third cranks and extending crosswise to said shaft and includes a bottom end portion of said lever extending generally crosswise to the remainder of the lever and being pivotally received in said tubular portion.

4. The invention defined in claim 3 wherein said spaced members are rigidly interconnected and are pivotally mounted for swinging movement about a fixed axis located in a common vertical plane with the axis of said tubular portion of said first crank.

5. The invention defined in claim 3 wherein said shaft is horizontal; said spaced members extending upwardly from said shaft; and said spaced members being vertical when in said neutral position.

6. The invention defined in claim 5 wherein said means included by said parts include a pair of angle members which respectively extend oppositely from the spaced members and are horizontally disposed when said members are in said vertical neutral position; said means and said arm portions of said second and third cranks including opposed bearing surfaces on said angle members and on said arm portions.

7. The invention defined in claim 6 wherein the bearing surfaces on said angle members are the ends of a pair of screws and said screws being mounted to said angle members for adjustment towards and away from said bearing surfaces on said arm portions when said spaced members are in said neutral position.

8. The invention defined in claim 5 wherein the pivotal mounting of said spaced members includes a horizontal tubular member between and integral with the bottoms of said spaced members; a pivot bolt extending through axially aligned apertures extending horizontally respectively through a bracket fixed to the vehicle and through said shaft and said tubular member being pivotally mounted on said bolt.

9. The invention defined in claim 5 wherein said shaft is mounted slightly forwardly of said seat and wherein said spaced members and said lever are located so as to project upwardly forwardly of and centrally with respect to said seat when said spaced members are in said neutral position whereby the spaced members and the lever will be located between the legs of an operator seated in the seat.

10. A single-lever actuated linkage for selectively controlling three elements of a vehicle comprising: a first crank mounted on said vehicle for rotation about a fixed axis and being operatively connected to one of said three elements; second and third cranks pivotally mounted on said vehicle in the region of said fixed axis and relatively close to said first crank; said second and third cranks being operatively connected respectively to the other two of said three elements; member means extending crosswise to said fixed axis and being pivotally mounted on said vehicle, in the vicinity of said cranks, for swinging movement lengthwise of said fixed axis; said member means including first means extending adjacent to the regions occupied by said second and third cranks; said second and third cranks each having arm portions respectively located in the paths of movement of said first means for coaction therewith for movement thereby when said member means is swung to either side of an intermediate, neutral position; a lever for engagement with said member means for rocking the same to the opposite sides of said neutral position; said lever extending crosswise to said fixed axis and being pivotally connected to said first crank for swinging movement lengthwise of said fixed axis; and said member means including second means spaced closely adjacent the opposite sides of said lever for contact thereby when said lever is swung lengthwise of said fixed axis.

11. The invention defined in claim 10 wherein said second means of said member means comprise a pair of side-by-side members extending crosswise to said fixed axis.

12. The invention defined in claim 11 wherein said side-by-side members are rigidly interconnected and are mounted for swinging movement about an axis located midway between the second and third cranks, and the axis of the pivotal connection between said first crank and said lever also being located midway between the second and third cranks.

13. The invention defined in claim 12 wherein said fixed axis is horizontal and wherein the axis of pivoting of said spaced members is horizontal and is perpendicular to and intersects said fixed axis.

14. The invention defined in claim 11 wherein said spaced members project upwardly and are substantially vertical when in said neutral position, said pivotal connection of said spaced members being located vertically below the pivotal connection between said first crank and said lever, and the rigid connection between said spaced members including a web joining the tops of said members and having a slot therein extending crosswise to said axis and said lever being received in said slot for free swinging movement therein crosswise to said fixed axis for rocking said first crank.

15. The invention defined in claim 14 wherein a shaft is fixed along said fixed axis and wherein said first, second, and third cranks are mounted for pivotal rocking about said shaft.

16. The invention defined in claim 13 wherein a shaft is fixed along said fixed axis and wherein said first, second, and third cranks are mounted for pivotal rocking about said shaft.

17. The invention defined in claim 12 wherein said first means includes a pair of angle members projecting oppositely equal distances from the spaced members.

18. The invention defined in claim 17 wherein said first means and second and third levers include opposed bearing surfaces on said angle members and on said second and third cranks.

19. The invention defined in claim 18 wherein the bearing surfaces carried by said angle members are respectively a pair of screws axially adjustably mounted on said angle members and disposed such that the ends of the screws will be moved towards and away from the bearing surfaces on said second and third cranks.

20. The invention defined in claim 17 wherein a shaft is fixed along said fixed axis and wherein said first, second, and third cranks are mounted for pivotal rocking about said shaft.

21. The invention defined in claim 12 wherein a shaft is fixed along said fixed axis and wherein said first, second, and third cranks are mounted for pivotal rocking about said shaft.

22. The invention defined in claim 10 wherein said second and third cranks are mounted for pivotal rocking about said fixed axis.

23. The invention defined in claim 22 wherein a shaft is fixed along said fixed axis and wherein said first, second, and third cranks are mounted for pivotal rocking about said shaft.

* * * * *

UNITED STATES PATENT OFFICE
CERTIFICATE OF CORRECTION

Patent No. 3,633,436     Dated 11 January 1972

Inventor(s) Thomas William Freiburger

It is certified that error appears in the above-identified patent and that said Letters Patent are hereby corrected as shown below:

Column 6, line 17, change "11" to -- 13 --.

Signed and sealed this 13th day of June 1972.

(SEAL)
Attest:

EDWARD M. FLETCHER, JR.
Attesting Officer

ROBERT GOTTSCHALK
Commissioner of Patents